Figure 1:
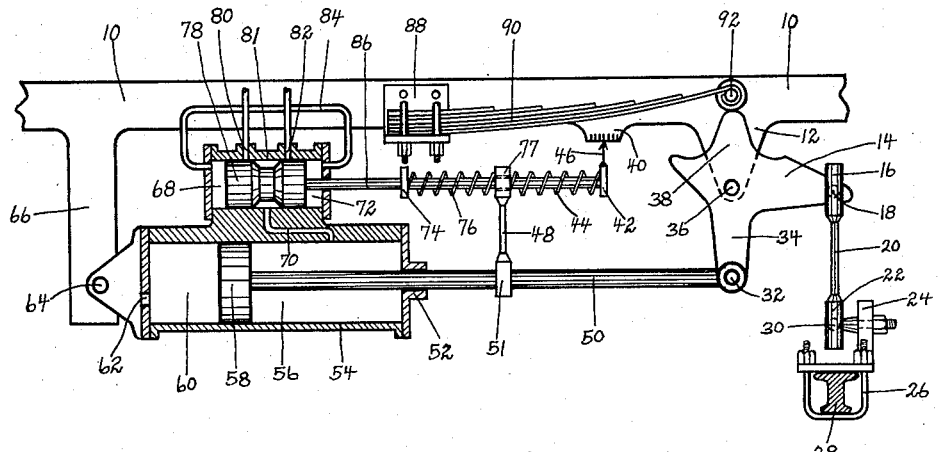

Nov. 12, 1935.  A. V. BEDFORD ET AL  2,021,043
AUTOMATIC CONTROL FOR VEHICLE SUSPENSION
Filed June 12, 1934    2 Sheets-Sheet 1

Inventors:
Alda V. Bedford.
Daniel C. Hoffmann

Patented Nov. 12, 1935

2,021,043

UNITED STATES PATENT OFFICE 2,021,043

AUTOMATIC CONTROL FOR VEHICLE SUSPENSION

Alda V. Bedford, Collingswood, N. J., and Daniel C. Hoffmann, Philadelphia, Pa.

Application June 12, 1934, Serial No. 730,210

13 Claims. (Cl. 267—15)

This invention relates to automatic control for vehicle suspension systems, and more particularly to an automatic controlling device for regulating the effective working range of a non-linear suspension system in accordance with the vehicle load.

Primarily our invention is devised for use in connection with a vehicle spring suspension system, such, for instance, as that disclosed in our application for U. S. Patent, Serial Number 709,144, filed January 31, 1934. In the application referred to, we have described and claimed an improved vehicle spring suspension in which a power element is used to improve the riding quality of the vehicle by making the spring suspension extremely flexible over a small portion of its normal working range. In such a flexible suspension system, the average height of the vehicle body from the road surface varies considerably with variations in the amount of load carried by the vehicle. The variation in vehicle height with load causes the average deflection of the spring suspension to extend beyond the extremely flexible portion of its normal working range with the result that maximum riding comfort is not obtained under all conditions of load. In the aforementioned copending application, we have also described and claimed a body-leveling power element, the functions of which are to maintain a constant average height of the vehicle body above the road surface regardless of load and to prevent the average deflection of the spring suspension from extending beyond the extremely flexible portion of its normal working range under all conditions of load.

The subject matter of the present application involves novel combinations of the aforementioned power elements and automatic controlling devices therefor. It would be possible to control the power element by manual means operated by the driver or passenger in the vehicle. Such manual control is not desirable because it would require frequent attention and would be very inconvenient. To avoid these and other disadvantages, the power element must be under continuous automatic control. Such controlling means should respond to changes in the average height of the vehicle body, as such changes are due to changes in the load carried by the vehicle. The controlling means should not respond to instantaneous changes in the height of the vehicle body, as such changes are due to irregularities in the road surface. The primary object of this invention, therefore, is to provide automatic controlling means for a power element adapted to maintain a constant average height of the vehicle body above the road surface and to prevent the average deflection of the spring suspension from extending beyond the extremely flexible portion of its normal working range.

Various purposes may be served on a vehicle by providing a fluid pressure source, the pressure of which is proportional to the load carried by the vehicle. For instance, in a fluid pressure brake system, it may be desirable to adjust the braking pressure according to the load, and on vehicles equipped with air springs, to regulate the pressure as the load changes. Also, in order to secure maximum riding comfort, it is desirable to vary the tire pressure and the stiffness of the seat cushions in accordance with the load. Another object of our invention, therefore, is to provide a fluid pressure source, the pressure of which is proportional to the load carried by the vehicle.

Figure 2:
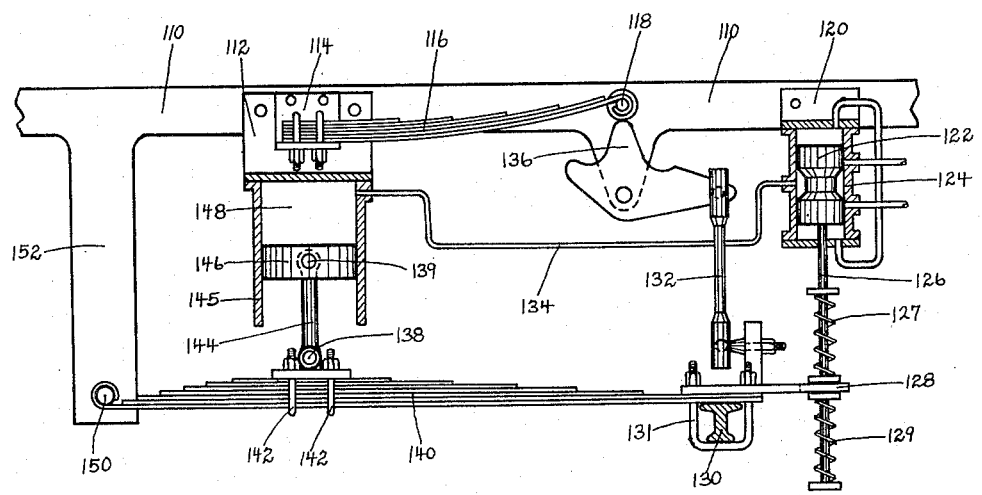
Figure 3:
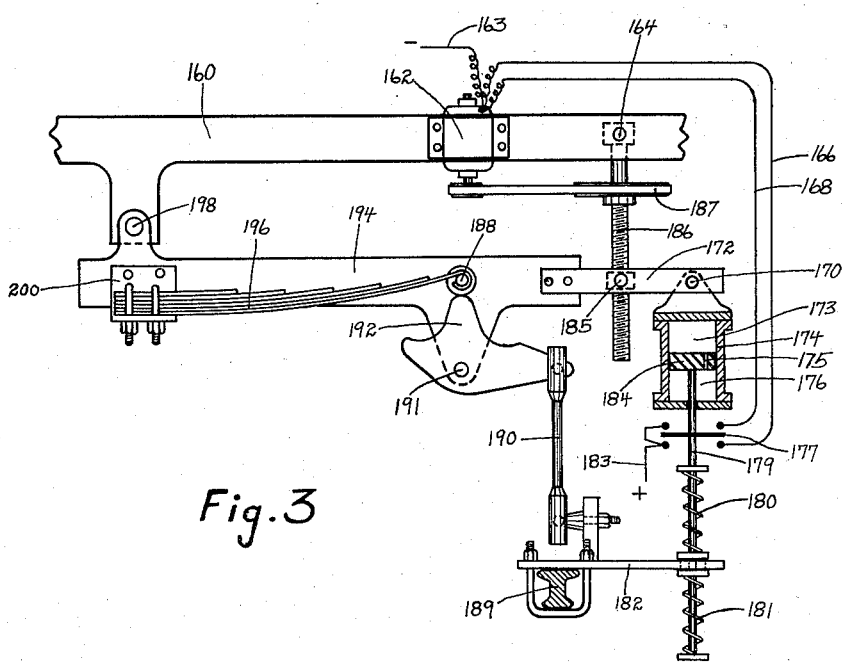

To accomplish these and other objects, the present invention consists of parts and combinations of parts which will be understood from the following description and from the accompanying drawings. In the drawings Fig. 1 is a fragmentary side view of a vehicle, showing the preferred embodiment of our invention, partly in section, applied thereto, Fig. 2 is a similar view, showing another embodiment of our invention, and Fig. 3 is a similar view, showing a third embodiment of the present invention.

Referring now to Fig. 1, the numerals 10 designate a portion of the frame of the vehicle. A downwardly extending arm 12 of the frame 10 supports a bearing 36 upon which is pivotally mounted a cam 38. An arm 14 of the cam 38 carries at its extremity a ball 18 securely fastened thereto. A similar ball 30 is supported by the bracket 24, which is securely fastened to the axle 28 of the vehicle by the clamps 26. The ball 18 engages a socket 16 fastened to the upper end of the link 20. The ball 30 engages a socket 22 fastened to the lower end of the link 20. The balls 18 and 30 are free to rotate in their respective sockets 16 and 22. This form of link, well known in the art, is used to allow the axle 28 freedom of motion with respect to the cam 38 in all directions except vertically.

It is understood that the frame 10 is supported upon the axle 28 in the usual manner by the main springs, omitted from the drawings for the sake of clarity. It is further understood that the type of axle shown is only illustrative and not restrictive.

The ball 30 may be connected to any suitable unsprung member of the chassis, provided such member moves in accordance with the vertical motions of the wheels with respect to the frame.

One end of a cantilever leaf spring 90 is securely fastened to the frame 10 by the bracket 88. The other end of the spring 90 carries a roller 92 which is in constant engagement with the face of the cam 38.

A downwardly extending arm 66 of the frame 10 supports a bearing 64 upon which is pivotally mounted a cylinder 54. The cylinder 54 consists of two variable volume compartments 56 and 60, separated by a piston 58 reciprocable in the cylinder 54. A piston rod 50 connects the piston 58 to a downwardly extending arm 34 of the cam 38. The piston rod 50 is rotatably fastened to the arm 34 at the pivot 32. The cylinder 54 is provided with a stuffing box 52, which prevents the escape of fluid from the compartment 56 and also acts as a support for the right hand end of the cylinder 54. A passage 70 permits the flow or fluid into and out of the compartment 56 as will be described below. A vent 62 is provided in compartment 60 to allow the escape of fluid which would otherwise be trapped in the compartment and which would oppose the motion of the piston 58.

The spring 90, the roller 92, and the cam 38 constitute the power element that improves the riding quality of the vehicle by making the spring suspension system extremely flexible over a small portion of its normal working range. The cylinder 54, the piston 58, and the piston rod 50, in conjunction with the cam 38, constitute a pressure fluid motor that operates to maintain constant relative average positions of the roller 92 and the cam 38 in order to secure optimum working conditions of the combination and maximum riding comfort regardless of the amount of load being carried by the vehicle. These two power elements are substantially the same as the power elements described and claimed in the above mentioned copending application.

The apparatus which forms the subject matter of the present application includes the automatic controlling valve for controlling the flow of operating fluid between the pressure fluid motor and a source of fluid under pressure. The controlling valve is embodied in the cylinder 81, which is supported by the cylinder 54 and which may be integral therewith. A piston 78, having a shape substantially as shown in the drawings, is movable in the cylinder 81. The ends of the cylinder 81 are closed by fluid-tight cylinder heads, thereby forming variable volume compartments 68 and 72 on opposite ends of the piston 78. A constricted passage or pipe 84 connects the two compartments 68 and 72, which are filled with a viscous fluid. A passage 70 connects the compartment 56 to the middle of the cylinder 81. The passage 82 is connected to a source of fluid under pressure and the passage 80 is open to the free atmosphere.

The piston 78 is resiliently connected to the piston rod 50 of the pressure fluid motor by means of the rigid member 48, two compression springs 76 and 44, and the piston rod 86. The lower end 51 of the member 48 is securely fastened to the piston rod 50. The upper end 77 of the member 48 is provided with a hole through which the piston rod 86 is free to slide. Motion of the rod 50 is transmitted to the rod 86 through the springs 76 and 44 between the end 77 of the member 48 and the collars 74 and 42 securely fastened to the rod 86. A pointer 46 fastened to the collar 42 is arranged to play over a scale 40 fastened to the frame 10.

The mounting and arrangement of parts are such that when the vehicle is either standing still or running over a smooth road, the roller 92, the cam 38, and the piston 58 assume approximately the positions in which they are shown in Fig. 1, which may be considered their normal positions. These normal positions represent optimum working conditions of the roller 92 and the cam 38, and are the conditions under which maximum riding comfort is secured. The springs 76 and 44 are compressed equally, and the piston 78 is centered in the cylinder 81. The passages 80 and 82 are closed, and no fluid is allowed to enter or escape from the compartment 56.

If the vehicle is now assumed to run over irregularities in the road surface, the up and down movement of the axle 28 with respect to the frame 10 is transmitted to the piston 58 by the link 20, the cam 38, and the piston rod 50. Motion is also transmitted to the member 48, thereby causing said member to exert force on the springs 76 and 44, and on the piston 78 through the springs.

The force exerted on the piston 78 is approximately proportional to the displacement of the member 48 from the normal position. It causes the piston to move slowly, thereby pumping fluid from one compartment to the other through the constricted passage 84. The pressure required to pump the fluid through the constricted passage produces a restraining force which opposes the motion of the piston 78, and which increases with increase of speed of motion of the piston. Hence any motion produced by the limited force transmitted by the springs is slow. Therefore rapid oscillatory motions of the member 48, such as are caused by road irregularities, do not cause enough net motion of the piston 78 in either direction to uncover either of the passages 80 and 82.

Assume now that the load in the vehicle is increased. The average separation of the frame 10 and the axle 28 will now be less than it was before the load was increased. The relative average positions of the roller 92 and the cam 38 are no longer optimum, as the cam 38 rotated in a counterclockwise direction when the load was increased. The member 48 and the piston 58 oscillate about an average position which is toward the right of the normal position an amount corresponding to the increase in load. The average compression of the spring 44 is greater than the average compression of the spring 76. Therefore the spring 44 will exert greater average force on the piston 78 than the spring 76. This force will cause fluid to flow from compartment 72 to compartment 68, and the piston 78 will gradually move toward the right. This opens passage 82 and allows fluid under pressure to flow from the fluid pressure source through passages 82 and 70 into the compartment 56. The average pressure in compartment 56 is therefore increased, causing the average position of piston 58 to shift toward the left.

The movement of the piston 58 toward the left causes clockwise rotation of the cam 38 and an increase in the average separation of the frame 10 and the axle 28. This increase compensates for the decrease due to the added load, and the relative average positions of the roller 92 and the cam 38 become more nearly normal. When the average separation of the frame 10 and the axle 28 becomes approximately normal, the member 48 will move back and forth about a position which is approximately normal. Under these conditions, the average compression of the spring 76 is greater than the average compression of the spring 44, and the piston 78 will gradually move back toward the left as the fluid is forced from compartment 68 to compartment 72. When the piston 78 becomes centered again, the passages 80 and 82 are closed, thus cutting off the flow of fluid into the compartment 56.

The result, therefore, of an increase in the vehicle load is that the average fluid pressure in compartment 56 is increased sufficiently to support the increased load. Similarly, the result of a decrease in the load in the vehicle is that the average fluid pressure in compartment 56 is decreased sufficiently to compensate for the decrease in load. Therefore, the controlling valve embodied in the cylinder 81, driven by the member 48 through the springs 76 and 44, is an automatic controlling valve for the pressure fluid motor embodied in the cylinder 56, and the average force exerted by the pressure fluid motor in aiding the suspension system to support the load is proportional to the load carried by the vehicle.

Since the pressure fluid motor maintains a constant average separation of the frame 10 and the axle 28, it also maintains the proper constant relative average positions of the roller 92 and the cam 38 necessary for maximum riding comfort. The pointer 46 serves to indicate when the roller and cam are in their proper relative positions. This feature is useful as an aid in adjusting the apparatus for proper operation. It is apparent that since the average pressure in compartment 56 varies according to the load carried by the vehicle, the compartment 56, or a reservoir connected thereto, is a source of fluid pressure, the pressure of which is proportional to the load.

Particular reference is now made to Fig. 2, which shows another embodiment of our invention applied to a modified form of body-leveling power element. The numerals 110 designate a portion of the frame of the vehicle. The spring 116, the roller 118, the cam 136, and the link 132 are similar in all respects to the corresponding parts of the embodiment shown in Fig. 1, and constitute the power element for improving the riding quality of the vehicle by making the spring suspension system extremely flexible over a small portion of its normal working range.

One end of a spring 140 is pivotally fastened to a downwardly extending arm 152 of the frame 110 at the bearing 150. The other end of the spring 140 is securely fastened to the axle 130 by means of the clamps 131. In this embodiment, the pressure fluid motor consists of the cylinder 145, the piston 146, and the piston rod 144. One end of the rod 144 is pivotally fastened to the piston 146 at the bearing 139. The other end of the rod 144 is pivotally fastened to the spring 140 at the bearing 138, which is secured by the clamps 142. The cylinder 145 is supported by the bracket 112 fastened to the frame 110.

The automatic controlling valve is similar to the valve described in connection with the embodiment shown in Fig. 1. It consists of the cylinder 124 supported by the bracket 120 fastened to the frame 110. The piston 122 is resiliently connected to the axle 130 by the rigid member 128, two compression springs 127 and 129, and the piston rod 125. A pipe 134 connects the compartment 148 of the pressure fluid motor to the middle of the cylinder 124. The operation and function of the controlling valve is similar in all respects to that of the valve described in connection with the embodiment shown in Fig. 1.

The result of an increase in load in the vehicle is that the average fluid pressure in compartment 148 is increased. This causes the piston 146 to exert greater force on the spring 140, resulting in an increase in the average separation of the axle 130 and the frame 110. Similarly, the result of a decrease in the load on the vehicle is that the average pressure in compartment 148 is decreased sufficiently to compensate for the decrease in load. The pressure fluid motor therefore maintains a constant average separation of the frame 110 and the axle 130, thereby maintaining the proper constant relative average positions of the roller 118 and the cam 136 necessary for maximum riding comfort.

It should be noted that the embodiment shown in Fig. 2 differs from the embodiment shown in Fig. 1 in that the pressure fluid motor is operatively connected to the axle by means of an elastic member instead of by a rigid means. In either embodiment, additional elastic members for supporting the vehicle body upon the axle may or may not be used.

In the embodiments shown in Figs. 1 and 2, the controlled power elements are pressure fluid motors, and the automatic controlling means are adapted to control the flow of fluid between the motors and the fluid pressure sources. Our present invention is applicable also to power elements other than fluid pressure motors. Such a modified form is depicted in Fig. 3, to which particular reference is now made. This embodiment of our invention is particularly adaptable to heavy vehicles for which the ratio of variable load to total weight is comparatively small. It is not as necessary to maintain a constant average separation of the frame and axle of a heavy vehicle, because the average separation does not vary seriously with the load. However, the power element that controls the flexibility of the spring suspension system must be kept within its normal working range in order to secure maximum riding comfort under all conditions of load.

In this embodiment, the spring 196 is fastened to a mounting plate 194 by the bracket 200, and the cam 192 is pivotally mounted on the plate 194 at the bearing 191. The cam 192 is operatively connected to the axle 189 by the link 190, as in the embodiments previously described. The left hand end of the mounting plate 194 is pivotally supported on the frame 160 at the bearing 198. The right hand end of the plate is supported by a screw 186, which is pivotally supported on the frame 160 by a bearing 164 so that the screw is free to rotate and also free to swing as a pendulum. A nut 185 arranged to travel along the screw 186 is pivotally mounted between the two members 172 which are securely fastened to the plate 194. A cylinder 174, having a piston 184 reciprocable therein, is pivotally mounted between the members 172 at the bearing 170. Two variable volume compartments 173 and 176, each filled with a viscous fluid, are formed by the piston, and a constricted passage 175 in the piston connects the two compartments. The piston is resiliently connected to the axle 189, by the rigid member 182, two compression springs 180 and 181, and the piston rod 179.

The screw 186 is driven by a reversible electric motor 162 mounted on the frame 160 and belted to the pulley 187. The motor 162 is provided with a split field winding for the purpose of reversing its direction of rotation. It is controlled by a single pole double throw electric switch 177 actuated by the piston rod 179. The leads 183 and 163 are connected to a source of electric power; for example, a storage battery carried by the vehicle.

An increase in the amount of load being carried by the vehicle causes a decrease in the average separation of the frame 160 and the axle 189, and the roller 188 and cam 192 depart from the optimum relative average positions necessary for maximum riding comfort. The compression of the spring 180 is greater than the compression of the spring 181, and the piston 184 gradually moves upward as the fluid in compartment 173 is forced into compartment 176 through the constricted passage 175. The movement of the rod 179 actuates the switch 177 to connect wire 168 to wire 183, and the motor 162 is energized to drive the screw 186 in a direction to decrease the separation of the plate 194 and the frame 160. The roller 188 and cam 192 are thereby restored to the optimum relative average positions necessary for maximum riding comfort under the new load conditions. Similarly, a decrease in load causes the piston 184 to move downward gradually and actuate the switch 177 to connect wire 166 to wire 183, and the motor 162 is energized to drive the screw in a direction to increase the separation of the plate 194 and the frame 160. Therefore, the piston 184 contained in the cylinder 174 and driven by the oscillatory controlling member 182 through the springs 180 and 181 is an automatic controlling means for maintaining the proper constant relative average positions of the roller 188 and the cam 192 necessary for maximum riding comfort under all conditions of load.

It is understood that the electric motor 162 belted to the pulley 187 and controlled by the switch 177 is merely illustrative of a suitable form of drive for the screw 186, and our invention is not restricted thereby. It is apparent that power for driving the screw may be obtained from an air motor, from the vehicle propelling motor, from the transmission system, from the wheels, or from a device that derives its power from the relative motions of the frame 160 and the axle 189, provided, however, that such driver is reversible and under the control of suitable control means actuated by the rod 179.

In all of the embodiments, it is desirable that the constricted passage between the variable volume compartments of the automatic controlling means offer a substantially constant opposition to the flow of the viscous fluid. However, due to the variations in viscosity with changes in temperature and other considerations, it may be necessary to provide means for automatically or manually varying the constriction of the passages. Such means are well known in the shock absorber art.

The piston type valves shown in Figs. 1 and 2 are essentially three-way valves, and may be replaced by any of the well known types. However, it would be necessary to provide other means than the valve piston for restraining the motion of the valve by a force which increases with the speed of motion.

It is understood that for the purpose of this invention the piston and cylinder combinations may be replaced by other types of variable volume compartments, such as bellows, diaphragms, and so-called sylphons.

In case it is desired to use a non-compressible fluid for the operation of the pressure fluid motor of either embodiment, or in case it is desired to further decrease the stiffness of the spring suspension system, an additional elastic member may be inserted in the linkage connecting the pressure fluid motor to the axle.

The invention may be embodied in other specific forms without departing from the spirit or essential characteristics thereof. The present embodiments are therefore to be considered in all respects as illustrative and not restrictive, as various other forms will be apparent to those skilled in the art without departure from the spirit of the invention or the scope of the claims.

What we claim and desire to obtain by United States Letters Patent is:—

1. In a vehicle suspension system including a set of elastic members adapted to support the vehicle body upon its wheel axles, the combination of a power element having a negative spring characteristic effectively connected between said body and one of said axles, an elastic power element adapted to aid in supporting said body upon said axle, a source of motive power adapted to alter the effectiveness of said elastic power element in supporting said body upon said axle, reversible means for controlling said motive power, an elastic member adapted to exert force upon said reversible means in accordance with the separation of said body and said axle, and damping means adapted to oppose motion of said reversible means by a force which increases with speed of motion.

2. In a vehicle suspension system including a set of elastic members adapted to support the vehicle body upon its wheel axles, the combination of a power element adapted to exert force tending to alter the average separation of said body and one of said axles, a source of motive power adapted to change the effectiveness of said power element in altering said separation, a controlling means for controlling said source of motive power, an elastic member adapted and connected to exert force upon said controlling means in accordance with the instantaneous separation of said body and said axle, and a damping member adapted to oppose motion of said controlling means by a force which increases in response to an increase in the rate of motion of said controlling means.

3. In a vehicle suspension system including a set of elastic members partly supporting the vehicle body upon its wheel axles, the combination of a pressure fluid motor adapted to aid in supporting said body upon one of said axles, two sources of fluid under different pressures, variable means for alternatively connecting one of said sources to said motor, connecting the other of said sources to said motor, and substantially stopping all connections to said motor, an elastic means operatively coupling said axle and said variable means to transmit force thereto in accordance with the position of said body with respect to said axle, and damping means for restraining the motion of said variable means by a force which increases with increase of speed of said motion.

4. In a vehicle suspension system including a set of elastic members adapted to support the vehicle body upon its wheel axles, the combination of a power element adapted to exert force tending to alter the average separation of said body and one of said axles, a source of motive power adapted to change the effectiveness of said power element in altering said separation, a controlling means for controlling said source of motive power, variable means for actuating said controlling means including a variable volume compartment and being adapted to exert force in response to fluid pressure inside said compartment, two sources of fluid under different pressures, an elastic means operatively coupling said axle and said variable means to transmit force thereto in accordance with the position of said body with respect to said axle, and damping means for restraining the motion of said variable means by a force which increases with increase of speed of said motion.

5. In a vehicle suspension system including a set of elastic members supporting in part the vehicle frame upon its wheel axles, the combination of a power element having a negative spring characteristic over part of its working range, adjustable connections effectively connecting said power element between one of said axles and said frame and being adapted to alter the deflection of said power element corresponding to a given separation of said axle and said frame, and automatically functioning means for adjusting said connections in accordance with the mean deflection of said power element.

6. In a vehicle suspension system including a set of elastic members connected to support in part the vehicle frame upon its wheel axles, the combination of a power element having a negative spring characteristic over part of its working range, an adjustable screw effectively connecting said power element between said frame and one of said axles and operatable to alter the deflection of said power element corresponding to a given separation of said frame and said axle, a source of power for driving said screw, and automatically functioning means for controlling the application of said power to said screw in accordance with the mean deflection of said power element.

7. In a vehicle suspension system including a set of elastic members connected to support in part the vehicle frame upon its wheel axles, the combination of a power element having a negative spring characteristic over part of its working range, an adjustable screw effectively connecting said power element between said frame and one of said axles and operatable to alter the deflection of said power element corresponding to a given separation of said frame and said axle, a source of power for driving said screw, a controlling member for controlling said source, an elastic member adapted to exert force upon said controlling member in accordance with the deflection of said power element, and damping means adapted to oppose motion of said controlling member by a force which increases with the speed of said motion.

8. In a vehicle suspension system having a curvilinear pressure versus deflection characteristic and which is more flexible for the normal working mean height of the vehicle body relative to a wheel axle than for a more depressed position of said body, an elastic member and a pressure fluid motor operatively connected in series between said body and said axle and adapted to exert force tending to increase the separation of said body and said axle, a plurality of sources of fluid under different pressures, a valve member for controlling flow of fluid between said motor and said sources, an elastic driving member adapted to exert a driving force on said valve member in accordance with the instantaneous separation of said body and said axle, and a damping member for restraining said valve member from sudden motion.

9. In a vehicle suspension system including a set of elastic members supporting in part the vehicle frame upon its wheel axles, the combination of a power element having a negative spring characteristic over part of its working range, adjustable connections effectively connecting said power element between one of said axles and said frame and being adapted to alter the deflection of said power element corresponding to a given separation of said axle and said frame, a reversible source of motive power for actuating said adjustable connections, a controlling member for controlling said source, an elastic member adapted to exert force upon said controlling member in accordance with the deflection of said power element, and damping means adapted to oppose motion of said controlling member by a force which increases with the speed of said motion.

10. In a vehicle suspension system having a curvilinear pressure versus deflection characteristic and which is more flexible for the normal working mean height of the vehicle body relative to a wheel axle than for a more depressed position of said body, an elastic power element effectively connected between said body and said axle and adapted to exert force therebetween, and automatic means for altering said force corresponding to a given separation of said body and said axle in accordance with the mean position of said body with respect to said axle.

11. In a vehicle suspension system including a set of elastic members supporting in part the vehicle frame upon its wheel axles, the combination of a power element having a negative spring characteristic over part of its working range, a pressure fluid motor effectively connecting said power element between one of said axles and said frame and being adapted to alter the deflection of said power element corresponding to a given separation of said axle and said frame, a plurality of sources of fluid under different pressures, a cylinder having closed ends and containing a viscous fluid, a piston slidable in and cooperating with said cylinder to form a threeway piston type valve for controlling flow of fluid between said motor and each of said sources of fluid, an elastic member and a piston rod connected to apply force upon said piston in accordance with the instantaneous deflection of said power element and a restricted fluid connection between the two compartments formed in said cylinder by said piston.

12. In a vehicle suspension system having a curvilinear pressure versus deflection characteristic and which is more flexible for the normal working mean separation of the vehicle body and a wheel axle than for a lesser separation, an elastic power element effectively connected between said body and said axle and adapted to exert force therebetween, means including a pressure fluid motor and a plurality of sources of fluid under different pressures for altering said force for a given separation of said body and said axle, a cylinder having closed ends and containing a viscous fluid, a piston slidable in and cooperating with said cylinder to form a threeway piston type valve for controlling flow of fluid between said motor and each of said sources of fluid, an elastic member and a piston rod connected to apply force upon said piston in accordance with the instantaneous separation of said body and said axle, and a restricted fluid connection between the two compartments formed in said cylinder by said piston.

13. In a vehicle suspension system including a set of elastic supporting members, the combination of a power element adapted to exert force between the vehicle body and one of its wheel axles, said power element including a cam and a roller pressed upon said cam by a leaf spring, said roller being caused to roll upon said cam in accordance with the deflection of said power element, said power element having a negative spring characteristic over part of its working range, a second power element adapted to exert force tending to change the deflection of the first-named power element and thereby tending to change the position of said roller upon said cam, a source of power for altering the force exerted by said second power element, reversible means for controlling said source of power, a spring adapted to exert a driving force upon said reversible means which force is proportional to the instantaneous deflection of the first-named power element, and a piston and cylinder type dash pot connected to restrain said reversible means from responding quickly to the driving force of said spring.

ALDA V. BEDFORD.
DANIEL C. HOFFMANN.